United States Patent [19]
Whaley

[11] Patent Number: 5,678,498
[45] Date of Patent: Oct. 21, 1997

[54] PROCESS AND APPARATUS FOR VENTLESS COMBUSTION OF WASTE

[75] Inventor: Charles Wayne Whaley, Memphis, Tenn.

[73] Assignee: Envirotech, Inc., Wexford, Pa.

[21] Appl. No.: 540,974

[22] Filed: Oct. 11, 1995

[51] Int. Cl.$^6$ .................................................. F23J 11/00
[52] U.S. Cl. .................. 110/345; 110/189; 110/190; 110/206; 110/235; 110/215; 110/216; 110/346
[58] Field of Search ...................... 110/204–207, 215, 110/216, 345, 346, 235

[56] References Cited

U.S. PATENT DOCUMENTS

| | | |
|---|---|---|
| 1,532,647 | 4/1925 | Bergman . |
| 1,699,443 | 1/1929 | Owen . |
| 2,711,139 | 6/1955 | Martin . |
| 3,648,630 | 3/1972 | Hobbs et al. . |
| 4,245,569 | 1/1981 | Fallon, III ................ 110/345 X |
| 4,245,570 | 1/1981 | Williams ................... 110/204 X |
| 4,355,601 | 10/1982 | Hattiangadi . |
| 4,495,873 | 1/1985 | Blankenship . |
| 4,656,972 | 4/1987 | Shimoda . |
| 4,664,841 | 5/1987 | Kitahara et al. . |
| 4,739,713 | 4/1988 | Vier et al. ................. 110/345 X |
| 5,005,495 | 4/1991 | Feitel ........................ 110/345 X |
| 5,049,067 | 9/1991 | Hengelmolen . |
| 5,179,903 | 1/1993 | Abboud et al. . |
| 5,309,850 | 5/1994 | Downs et al. . |
| 5,335,609 | 8/1994 | Nelson et al. . |
| 5,402,739 | 4/1995 | Abboud et al. . |
| 5,410,121 | 4/1995 | Schlienger . |
| 5,450,801 | 9/1995 | Abboud . |

OTHER PUBLICATIONS

Abstract of Japanese Patent No. JA 0165413 (1985) to Ukita entitled "Device for Utilizing Refuse Burning Energy Without Pollution".

Abstract of Japanse Patent No. JA 0144512 (1985) to Zosen entitled "Combustion Exhaust Gas Recirculating Type Incinerator".

Primary Examiner—Henry A. Bennett
Assistant Examiner—Susanne C. Tinker
Attorney, Agent, or Firm—Paul D. Banjor, Jr.; Carol L. Bordas

[57] ABSTRACT

A ventless, combustible waste reduction process and apparatus which can utilize any type of combustion means for disposing of hazardous, as well as non-hazardous, burnable waste. Such wastes include toxic combustible liquids, oil slurries, soils contaminated with dioxin, PCBs, creosote, or any other potentially harmful or toxic combustible material. In particular, the present invention relates to a ventless, combustible waste reduction process in which the operating pressure is slightly below atmospheric pressure and which employs no venting or stack discharge of pollutants whatsoever. The entire flue gas stream is scrubbed, enriched with oxygen and recycled to the combustion chamber in varying amounts in response to pressure and temperature measurements taken in the combustion chamber to maintain the pressure and temperature in the combustion chamber within pre-selected ranges.

26 Claims, 5 Drawing Sheets

PROCESS AND APPARATUS FOR VENTLESS COMBUSTION OF WASTE

FIELD OF THE INVENTION

This invention relates to a closed loop combustible waste reduction process and apparatus which can utilize any type of combustion means for disposing of hazardous, as well as non-hazardous, burnable waste. Such wastes include toxic combustible liquids, oil slurries, soils contaminated with dioxin, PCBs, creosote, or any other potentially harmful or toxic combustible material. In particular, the present invention relates to a combustible waste reduction process and apparatus in which the operating pressure ranges from about 8.3 psia to about 15.0 psia and which employs no venting or stack discharge of pollutants whatsoever. In this process, the flue gas stream is scrubbed, enriched with oxygen and recycled to the combustion chamber.

BACKGROUND OF THE INVENTION

The disposal of hazardous waste is increasingly becoming a serious problem to industry as governmental regulations become more stringent. The disposal of hazardous waste is primarily accomplished through landfills and incineration. While the industry has historically preferred landfills over incineration, primarily because of cost, incineration has become a more competitive alternative due to the increased costs associated with the ever-expanding governmental regulations governing landfills. For example, a series of land disposal prohibitions covering specified classes of hazardous wastes took effect between 1986 and 1989. As the industry looks toward incineration as a primary means of disposing of hazardous waste, however, the growth of more stringent governmental restrictions continues to undermine the cost-effectiveness of incineration processes. For example, the destruction and removal efficiency (DRE) ratings for incineration are presently set at 99.99% for most hazardous waste, and 99.9999% for polychlorinated biphenyls (PCBs).

The incineration of hazardous waste is fraught with problems due to the fact that the waste must be rapidly disposed of before harm is done to the environment, but additionally, the destruction of any potentially toxic chemicals must be sufficiently complete so that the gases which evolve therefrom are non-hazardous. To completely decompose such chemicals, relatively highly efficient and high temperature combustion is required. Such high efficient and high temperature combustion is typically expensive to generate and maintain.

In addition, the discharge stack emissions from incineration are typically an important concern for several reasons. One reason is that the public views stack emission plumes with suspicion, and sometimes justifiable fears, that the incinerator operator is discharging hazardous, or toxic, gases into the atmosphere. Another reason is that federal and state authorities have implemented regulations governing stack emissions with regular monitoring, testing, and validation to insure that prescribed emission limits are not being exceeded.

There is a substantial need in the art, therefore, for improved combustible waste reduction processes and apparatus which are able to meet the present destruction and removal efficiency requirements, as well as requirements in the foreseen future.

It would be desirable to have a closed-loop combustible waste reduction process and apparatus in which no airborne emissions are released into the atmosphere and in which the solid byproducts from the process can be collected, tested, treated, and disposed of safely.

It would also be desirable to have a closed-loop combustible waste reduction process and apparatus capable of operating below atmospheric pressure to provide a faster burn rate which reduces combustible wastes more efficiently than traditional incinerator units.

SUMMARY OF THE INVENTION

In accordance with the present invention, there is provided an improved process and apparatus for combusting waste materials so that no gases or other byproducts of combustion are released into the atmosphere. The process comprises the steps of:

(a) loading combustible waste into an air-tight combustion chamber where the waste is combusted at a temperature from about 1800° F. to about 2000° F.;

(b) passing the resulting flue gas stream from the combustion chamber to a heat reduction chamber where the temperature of the flue gas stream is reduced to about 1100° F.;

(c) passing the flue gas stream from the heat reduction chamber to a heat exchanger where the temperature of the flue gas stream is further reduced;

(d) passing the flue gas stream from the heat exchanger through a particulate trap to remove particulates from the flue gas stream;

(e) passing the flue gas stream from the particulate trap to a gas cleaning chamber where acids within the flue gas stream are neutralized and additional particulates are removed;

(f) enriching the flue gas stream from the cleaning chamber with oxygen; and (g) injecting the oxygen enriched flue gas stream into the combustion chamber in varying amounts in response to pressure and temperature measurements taken in the combustion chamber to maintain the pressure and temperature in the combustion chamber within pre-selected ranges until the combustion of the waste is completed.

The apparatus of the present invention used for the ventless combustion of waste material comprises an air-tight combustion chamber; a heat reduction chamber in air-flow communication with the combustion chamber; a heat exchanger in air-flow communication with the heat reduction chamber; a first fan for drawing flue gases through the apparatus disposed between the heat exchanger and a gas cleaning chamber; a second fan for drawing the flue gases from the gas cleaning chamber through a conduit back into the combustion chamber; an oxygen supply for enriching the flue gases in the conduit with oxygen to produce an oxygen enriched flue gas stream; a motorized gas supply valve disposed in the conduit; and control means for maintaining the pressure and temperature in the combustion chamber within pre-selected ranges set in the control means by varying the flow of the oxygen enriched flue gas stream through the gas supply valve into the combustion chamber in response to pressure and temperature measurements from the combustion chamber monitored by the control means.

Without a vent or stack, the system of the present invention is not an incinerator and should not be classified and regulated as such. Classification as an incinerator indicates a unit has a stack and vents emissions, in varying amounts, into the atmosphere. Emissions vented by an incinerator include the following: Polychlorinated—CDD/CDF; Carbon Monoxide—CO; Particulate Matter—PM; Hydrogen Chloride—HCl; and Sulfur Dioxide —SO2.

The stackless, combustible waste reduction process of the present invention removes the solid materials from the emission gases which are continually recycled back into the combustion chamber. Through the entire combustible waste reduction process of the present invention, no airborne emissions are vented into the atmosphere. Moreover, by running the gases through a heat reduction chamber and a heat exchanger to cool the gases prior to re-entering the combustion chamber, a faster and more efficient combustion of waste is obtained than can be obtained in traditional incinerator units. For example, the ventless process and apparatus of the present invention reduces combustible waste 93% to 96%. Furthermore, as oxygen is used and replenished, by injecting oxygen back into the combustion chamber of the closed loop system, the combustion fire will operate in a slight vacuum, i.e., at slightly below atmospheric pressure.

BRIEF DESCRIPTION OF THE DRAWINGS

In the accompanying drawings, preferred embodiments of the invention and preferred methods of practicing the invention are illustrated in which.

DETAILED DESCRIPTION OF THE PREFERRED EMBODIMENTS

The present invention is described with respect to the preferred physical embodiments constructed in accordance herewith. It will be apparent to those of ordinary skill in the art that various modifications and improvements may be made without departing from the scope and spirit of the invention. Accordingly, the invention is not limited by the specific embodiments illustrated and described, but only by the scope of the appended claims, including all equivalents thereof.

Figure 1:
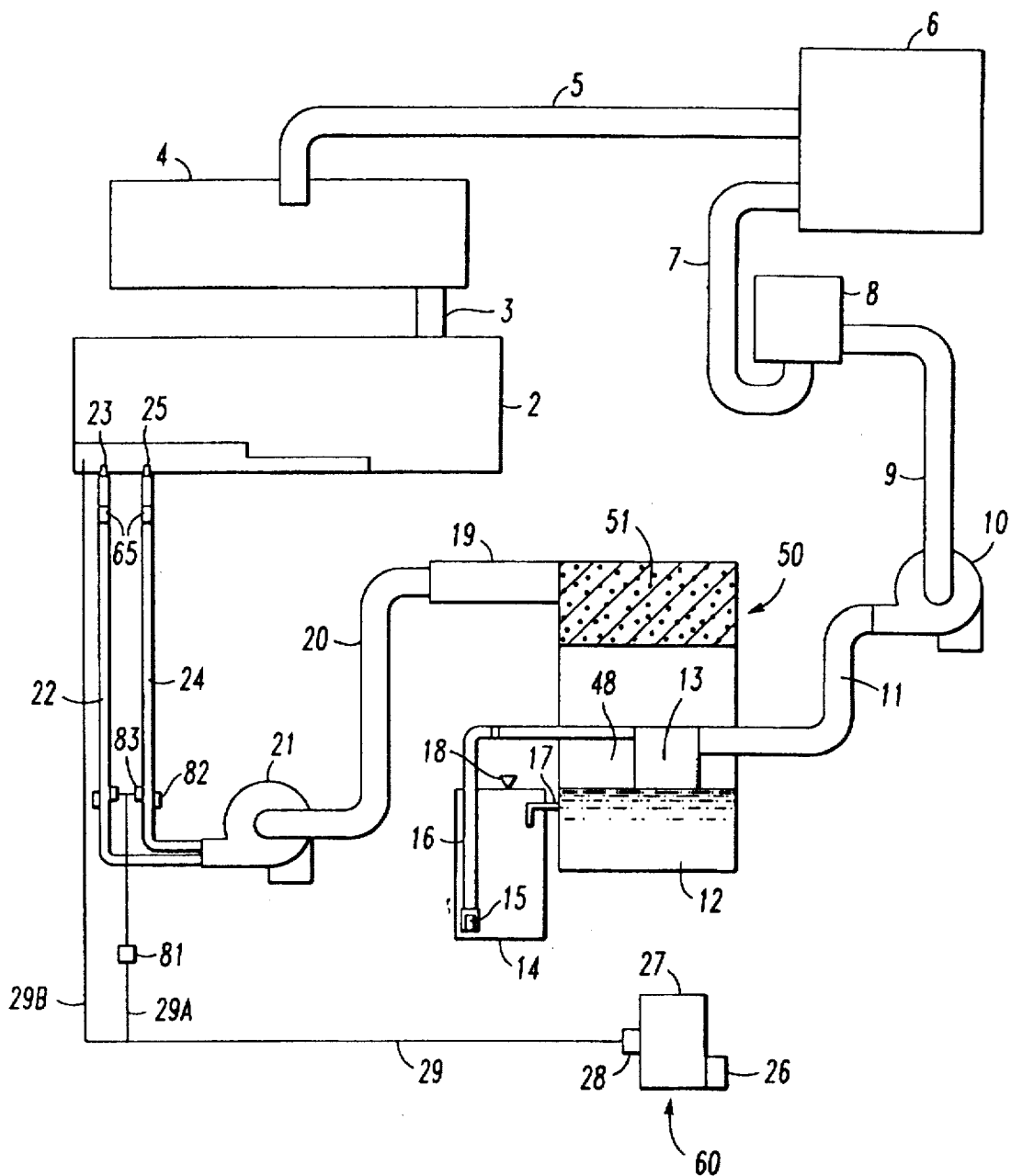
FIG. 1 is a simplified flow diagram of a preferred embodiment of the ventless, combustible waste reduction process and apparatus of the present invention.

The combustible waste reduction process and apparatus of the present invention can be best understood by reference to FIG. 1 which shows a preferred layout of the apparatus used to perform the combustible waste reduction process of the present invention. As described more fully below, the waste may be fed into the system in batches manually or automatically at pre-selected intervals depending, in part, on the amount of waste needed to be combusted.

Figure 2:
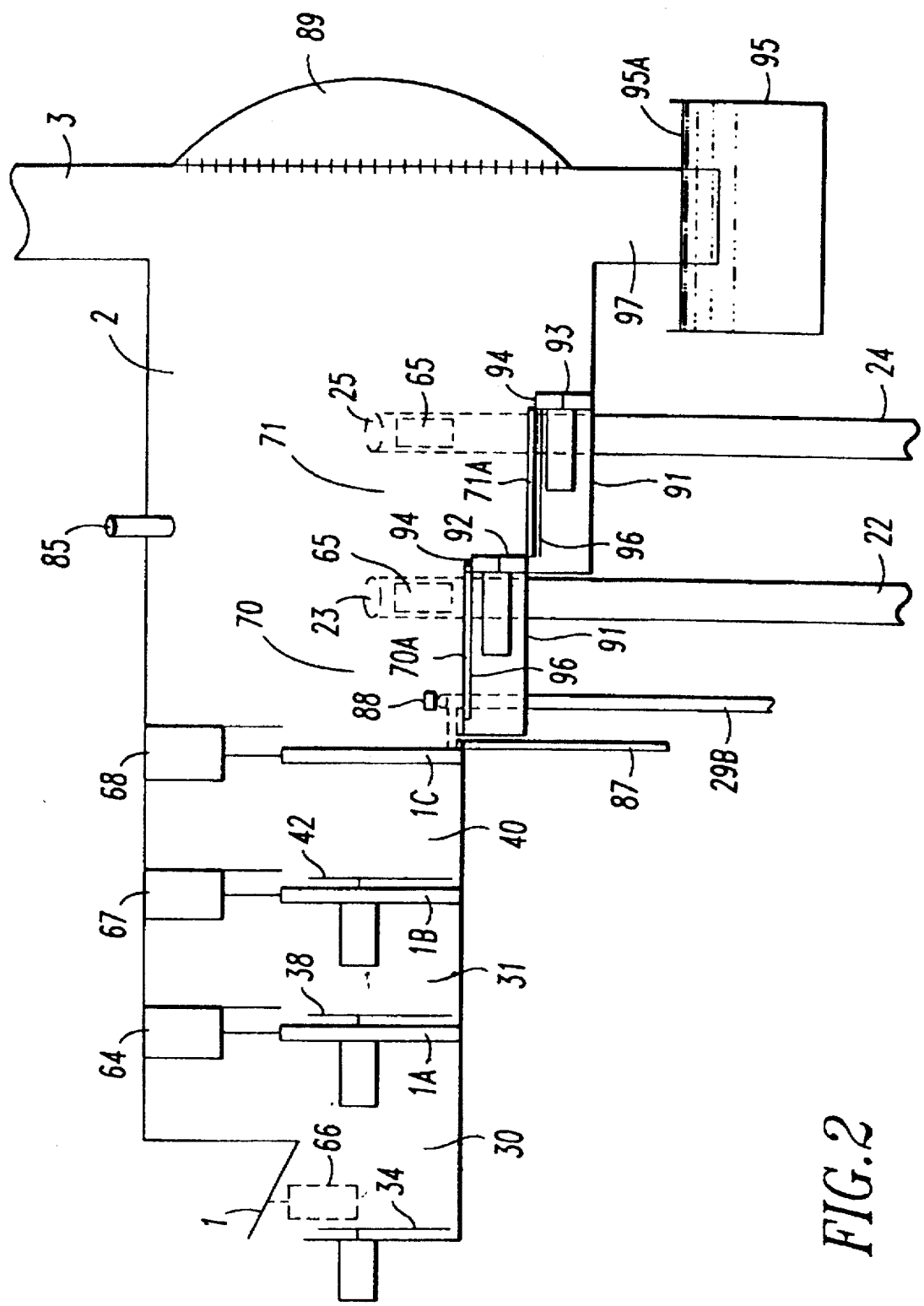
FIG. 2 is a cross-sectional view of an automated combustion chamber employed in a preferred embodiment of the ventless, combustible waste reduction process and apparatus of the present invention.

In a preferred embodiment of the invention in which waste is fed automatically, the combustion chamber is preferably constructed as shown in FIG. 2. As shown therein, combustible waste is fed from a hopper (not shown) into the combustion chamber 2 via hopper door 1 which is activated by hydraulic cylinder 66. After falling from the hopper, the waste enters the first waste holding chamber 30 and the hopper door 1 is closed by the hydraulic cylinder 66. The loading door 1A is then opened by spaced hydraulic cylinders 64 and the first hydraulic transfer ram 34 is activated to transfer the waste into the second waste holding chamber 31. As shown schematically in FIG. 2, the transfer ram 34 is mounted on a side of the combustion chamber 2. After the transfer ram 34 has been retracted and the door 1A closed, door 1B is opened and hydraulic transfer ram 38, which is mounted on door 1A, is activated to transfer the waste into the combustion loading chamber 40. Transfer ram 38 is then retracted and door 1B is closed. Hydraulic cylinders 67 are used to moved door 1B up and down between its closed and open positions. At this point, the hydraulic fire door 1C is opened to provide access to the first combustion zone 70 of combustion chamber 2. The fire door 1C is articulated by hydraulic cylinders 68 and is preferably lined with refractory material on the side facing the first combustion zone 70. After the fire door 1C has been opened, the hydraulic transfer ram 42, which is mounted on door 1B, is activated to transfer the waste into the first combustion zone 70. Door 1C is then closed and combustion of the waste may be initiated if not already in progress. Using the above-described series of waste holding chambers and transfer rams, the waste material can be automatically loaded into the combustion zones 70 and 71 without venting any flue gases into the atmosphere.

Each of the doors 1A, 1B and 1C are gate-type doors that articulate within opposing guide frames mounted to the sides of the combustion chamber 2. Small hydraulic cylinders (not shown) are mounted in the frame members on both sides of each door. The cylinders on one side of the door operate to immobilize the door within the frame members by forcing the door against the opposing cylinders and vice versa.

Figure 4A:
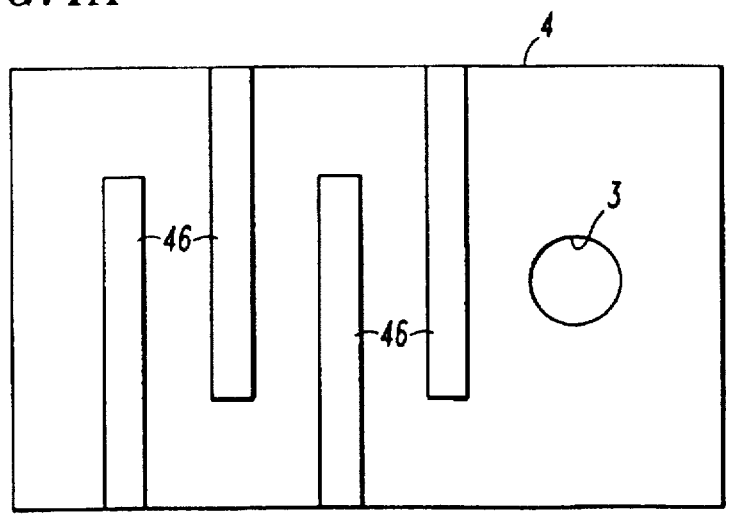
FIG. 4A is a cross-sectional view of the lower section of the heat reduction chamber taken along Line 4—4 of FIG. 4.
Figure 4:
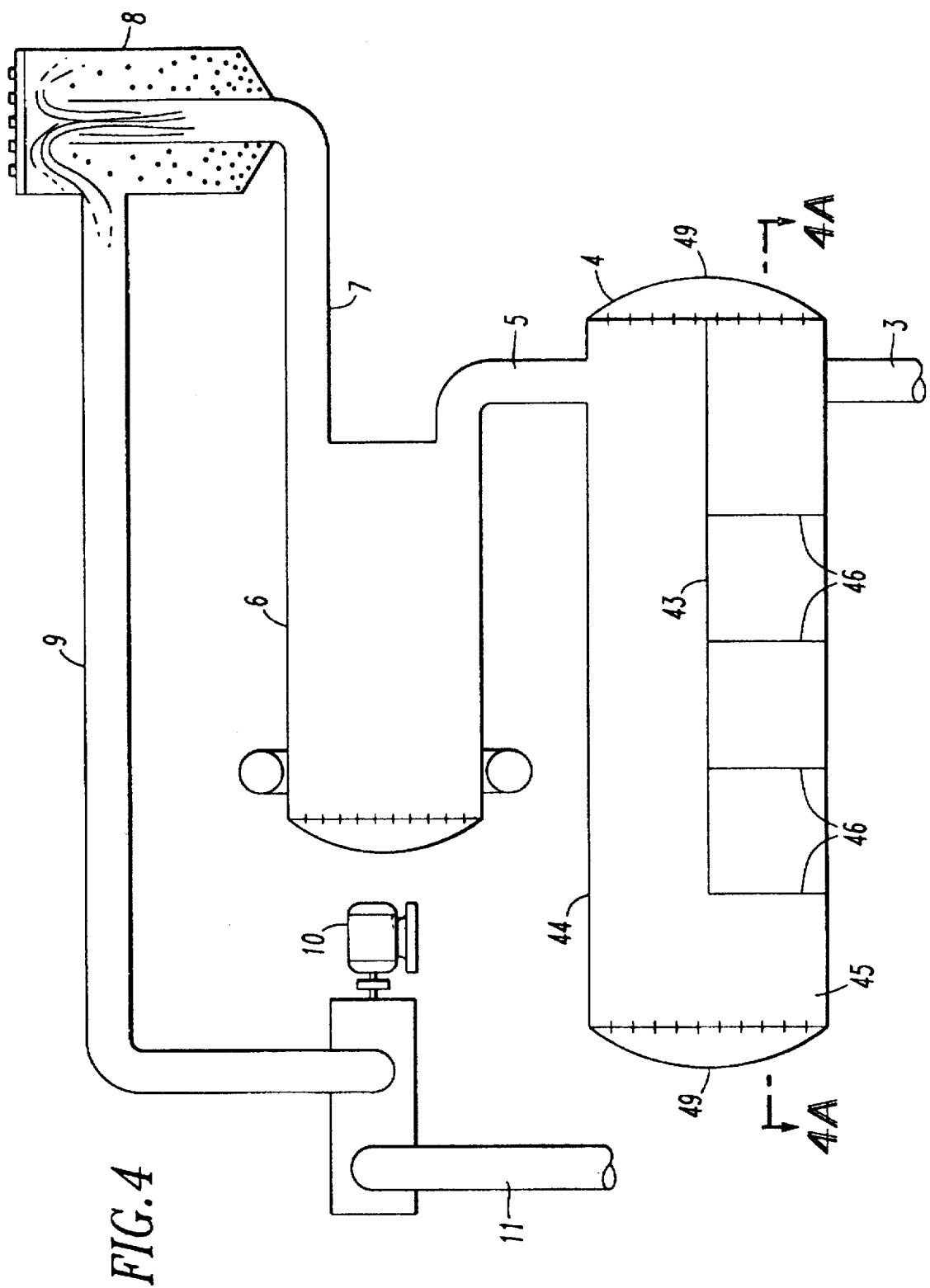
FIG. 4 is a cross-sectional view of an upper heat reduction chamber, a heat exchanger and a particulate trap employed in a preferred embodiment of the ventless, combustible waste reduction process and apparatus of the present invention.

The flue gas stream from the combustion chamber 2 is piped to an upper, heat reduction chamber 4 via transfer duct 3. The upper chamber 4 is also lined with insulation and refractory material, rated up to 2,400° F., to match the combustion chamber 2. The chamber 4 functions as a cool down chamber for the gases prior to entering the heat exchanger/boiler 6 via transfer duct 5. In the heat reduction chamber 4, the temperature of the flue gas stream is reduced from about 1800° F. to about 1100° F. Unlike a conventional incinerator's upper chamber that is a second stage combustion chamber, the upper chamber 4 is a cool down chamber. The process of the present invention does not require a second stage combustion chamber. As shown in FIG. 4, the upper, heat reduction chamber 4 is divided by horizontal wall 43 into upper and lower sections 44 and 45, respectively. As shown in FIG. 4A, deflectors 46 are staggered within the lower section 45 which trap a significant portion of the particles or fly ash carried by the flue gases passing therethrough. The particulates trapped by the deflectors 46 in the lower section 45 are periodically removed via domed doors 49.

If energy recovery is to be utilized, the heat exchanger/boiler 6 drops the temperature of the gases to 350° F. as they pass through. Over a period of time, the exhaust temperature of the heat exchanger 6 will continue to increase. Upon the exhaust temperature reaching 500° F., the heat exchanger 6 will then need to be cleaned.

Figure 5:
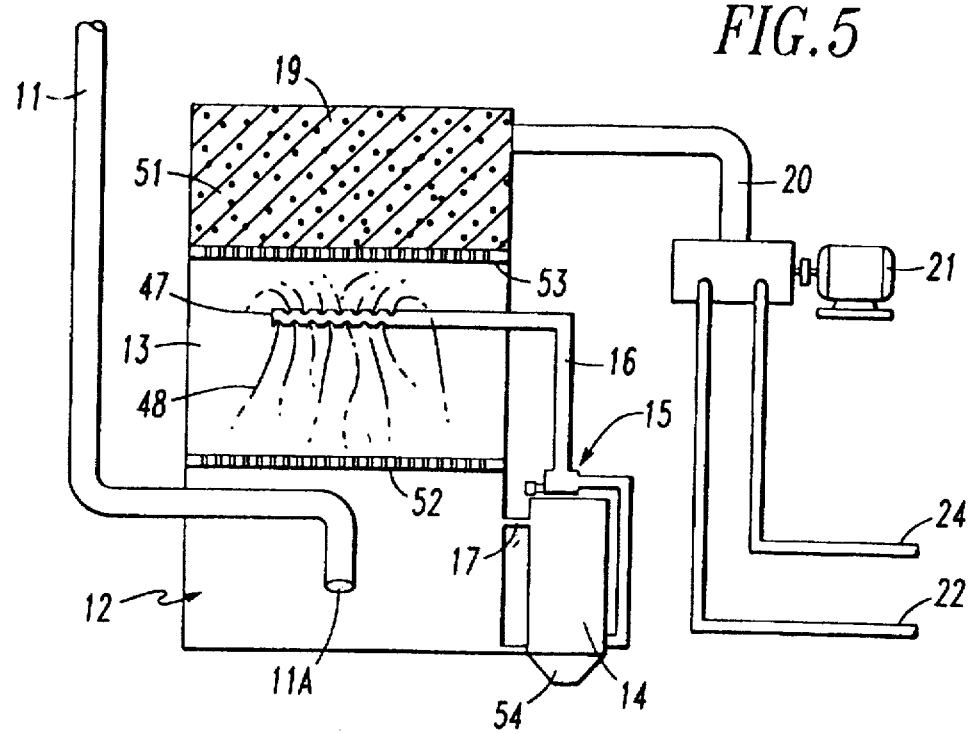
FIG. 5 is an expanded cross-sectional view of a gas cleaning chamber employed in a preferred embodiment of the ventless, combustible waste reduction process and apparatus of the present invention.

An induction fan 10 pulls gases from the upper, heat reduction chamber 4 and the heat exchanger 6 through the transfer duct 7 into the particulate trap 8, which filters out additional large particulate matter. The flue gas stream is then passed through transfer duct 9, through the induction fan 10 and transfer duct 11 into the gas cleaning chamber 50 comprising a lime bath 12, a gas wash 13 and a charcoal chamber 19. As shown in FIGS. 1 and 5, the gas cleaning chamber 50 preferably comprises one vessel having three separate cleaning stages 12, 13 and 19. In operation, the induction fan 10 blows gases into the lime bath 12. The outlet 11A of transfer duct 11 is positioned so that the gases are released at a depth at least 30% below the upper surface of lime bath 12 which is covered by a perforated steel plate or screen 52. The gases pass through the lime bath 12, where certain acids are neutralized, into the second stage gas wash 13 where the gases pass through the lime water spray 48 emanating from nozzle 47. The lime water spray 48 acts to trap smaller particulate matter which has passed through the lower section 45 of the heat reduction chamber 4 and the particulate trap 8. The lime bath 12 and gas wash 13 with lime water spray 48 are replenished from the lime/water mixing tank 14. As shown in FIGS. 1 and 5, the mixing tank 14 includes a high pressure pump 15 and a supply pipe 16 for pumping the lime/water mixture into the gas wash 13 as the lime water spray 48. Lime is introduced into the mixing tank 14 via lime injection port 18. Return pipe 17 provides for the return of the lime water including solid materials from the lime bath 12 to the mixing tank 14 which incorporates a lower sludge basin 54 where some of the fly ash and other solid materials are separated from the lime water and removed from the system.

In the charcoal chamber 19, which comprises the third stage of the gas cleaning chamber 50, the gases pass through a filter 51 which comprises loosely packed activated charcoal supported on the perforated steel plate or screen 53. The charcoal filter 51 removes some of the metals from the flue gases to complete the cleaning process thereof.

After the gases exit the filter 51, they are drawn through duct 20 by the induction fan 21 into separate lines 22 and 24 which communicate with the first and second combustion zones 70 and 71, respectively. In lines 22 and 24, oxygen is mixed, at a 20% to 30% ratio, with the gases to raise the system pressure to five (5) psi over atmospheric pressure. Oxygen supply 60 comprises an oxygen generator 26, oxygen storage tank 27 and oxygen vaporizer 28 to supply oxygen via oxygen supply duct 29 to both the lines 22 and 24 via line 29A and to the combustion chamber 2 via line 29B. The oxygen enriched flue gas stream is then forced by the injection fan 21 into the combustion chamber 2 through injection supply lines 22 and 24 having injection ports 23 and 25, respectively, located on the ash rams 92 and 93 within the combustion chamber 2.

Figure 6:
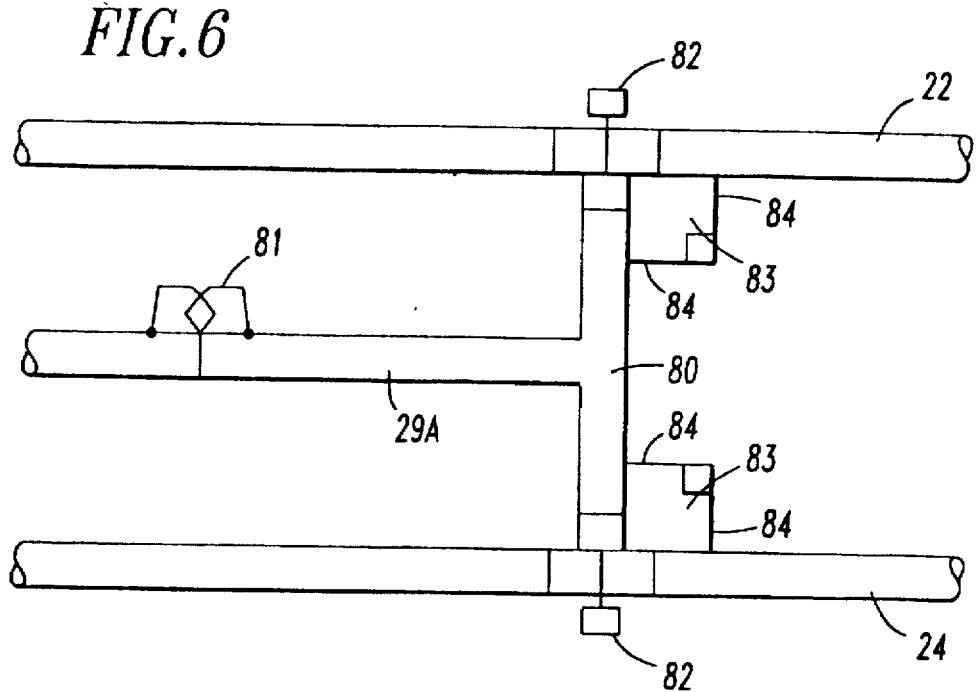
FIG. 6 is an expanded cross-sectional view of the junction between the oxygen supply line and the lines which recycle the cleaned and oxygen enriched flue gases back into the combustion chamber employed in a preferred embodiment of the ventless, combustible waste reduction process and apparatus of the present invention.

FIG. 6 illustrates in greater detail the juncture of oxygen supply line 29A with lines 22 and 24. As shown therein, the supply line 29A splits into a tee 80 for engagement with the respective lines 22 and 24. A pressure regulator 81 is located on the oxygen supply line 29A for regulating pressure in line 29A from about 2000 psi to about 14.7 psi or atmospheric pressure on the combustion chamber side of the regulator 81. Motorized mixing valves 82 are disposed in lines 22 and 24 at the points where those lines intersect with the tee 80 of the oxygen supply line 29A. The motorized mixing valves 82 are controlled by the controllers 83 which incorporate sensors 84 that measure the pressure differential delta $P_1$ across the mixing valves 82, i.e., between the oxygen supply line 29A which is regulated at about 14.7 psi and the lines 22 and 24. As the pressure differential delta $P_1$ increases or as the pressure in lines 22 and 24 drops below atmospheric due to the burning of the oxygen in the combustion chamber 2, the controllers 83 allow the motorized mixing valves 82 to open to allow oxygen to be mixed with the cleaned flue gases and the mixture is fed into the combustion chamber 2 via the injection ports 23 and 25.

The flow of the oxygen enriched flue gases into the combustion chamber 2 is further controlled by pressure regulated valves 65 located in lines 22 and 24 near the injection ports 23 and 25. The pressure regulator valves 65 are motorized and are connected to the controller of the system which activates the valves 65 in response to temperature and pressure measurements monitored by the controller. The process controller may comprise any suitable microprocessor or a basic programmable logic controller. Preferably, the valves 65 are Honeywell BG1600 gas supply valves which are knife-type valves, the openings of which can be varied between minimum and maximum settings.

As shown in FIG. 2, a thermocouple well 85 is disposed within the combustion chamber 2 for holding a thermocouple (not shown) for monitoring the temperature inside the combustion chamber 2. Other temperature control relays and pressure control relays may also be employed for monitoring the temperature and pressure throughout various parts of the system. In operation, the initial batch of waste is loaded and transferred to the first combustion zone 70 within the combustion chamber 2 as described above with reference to FIG. 2. The waste is then ignited by the ignitor 88 which ignites the mixture of oxygen gas and a flammable gas such as propane from lines 29B and 87, respectively. As shown in FIG. 2, lines 29B and 87 intersect near the ignitor 88 within the combustion chamber 2. After the waste has been ignited, the flow of oxygen from line 29B and flammable gas from line 87 is shut off. The flammable gas supply (not shown) preferably comprises a tank of liquified gas such as propane. In burning the waste, the controller maintains the temperature within the combustion chamber 2 at a predetermined value, preferably 1800° F. As the waste is burned, oxygen is consumed creating a negative pressure or slight vacuum within the combustion chamber 2. In order to keep the temperature in the combustion chamber 2 at the desired setting, the controller allows valves 65 to open to allow the oxygen enriched flue gases to enter the combustion chamber 2. If the temperature in the combustion chamber 2 starts to rise above the temperature setting in the controller, the controller either closes the valves 65 completely or reduces the openings therein to eliminate or reduce the flow of oxygen enriched gases into the combustion chamber 2. Likewise, if the pressure in the combustion chamber 2, which is air-tight, is below 14.7 psia and the temperature therein is at or below the preset value in the controller, the controller will open the valves 65 sufficiently to raise the temperature in the combustion chamber 2 to the preset value or to maintain the temperature at the preset value. The controller will close the valves 65 to shut off the flow of oxygen enriched flue gases to the combustion chamber 2 if the pressure therein drops to 8.3 psia or below to keep from creating too great a vacuum in the combustion chamber 2.

When the batch of waste is nearly consumed, the fire in the combustion chamber 2 will start to burn less vigorously as the waste fuel is depleted. At a certain point during such a "burn down," the pressure in the combustion chamber 2 is likely to reach 14.7 psia since less oxygen is being consumed than the amount entering the combustion chamber 2. When the pressure reaches 14.7 psia in the combustion chamber 2, the controller will close the valves 65 until the pressure drops below 14.7 psia, even though the temperature is below the preset value in the controller. Here, the response of the controller to the pressure measurement within the combustion chamber 2 takes precedence over the temperature measurement therefrom. Since at this point no oxygen enriched gas is entering the combustion chamber 2, the pressure therein will eventually drop back below 14.7 psia as long as the fire in the combustion chamber 2 continues to burn. When the pressure drops below 14.7 psia again in the combustion chamber 2, the controller will open the valves 65 until the pressure therein reaches 14.7 psia and then the valves 65 will again be closed. The system automatically modulates in this manner during the "burn down" until all the waste is combusted.

In the modular combustion chamber 2 shown in FIG. 2, once the waste and combustion zone 70 has burned sufficiently or after a predetermined period has elapsed (usually based on the characteristics of the waste being burned) another batch of waste which has been loaded and transferred into the combustion loading chamber 40 will be transferred by the combustion loading chamber hydraulic ram 42 into the combustion zone 70 as described above. As the ram 42 pushes the new batch of waste into the combustion zone 70, the waste then being combusted therein is pushed from the platform 70A down onto platform 71A. Each of the platforms 70A and 71A preferably is made from refractory bricks laid on top of the sheet metal housing 91 for the hydraulic combustion chamber rams 92 and 93. The bottom faces of the housings 91 are sealed with elastomeric gaskets (not shown) before being bolted onto the housings 91 to maintain the air-tightness of the combustion chamber 2. As each successive batch of waste is transferred into the combustion chamber 2, the combusted waste is transferred by the hydraulic rams 42, 92 and 93 towards the wet ash tank 95 having a water level indicated by 95A. The hydraulic rams 92 and 93 have guide rods 94 attached to the faces of the rams which prevent the ram faces from being twisted by the waste. The guide rods 94 run in and out of cylindrical conduits 96 disposed within the housings 91. In addition, compression seals are mounted between the cylinder and the face of the rams 92 and 93 to further seal the combustion chamber 2. A conventional type combustion chamber ram does not have a compression seal for the bore of the cylinder to run through. The combusted ashes ultimately are transferred into the wet ash tank 95 via conduit 97 where the ashes can be removed from the system without interrupting the operation thereof.

Figure 3:
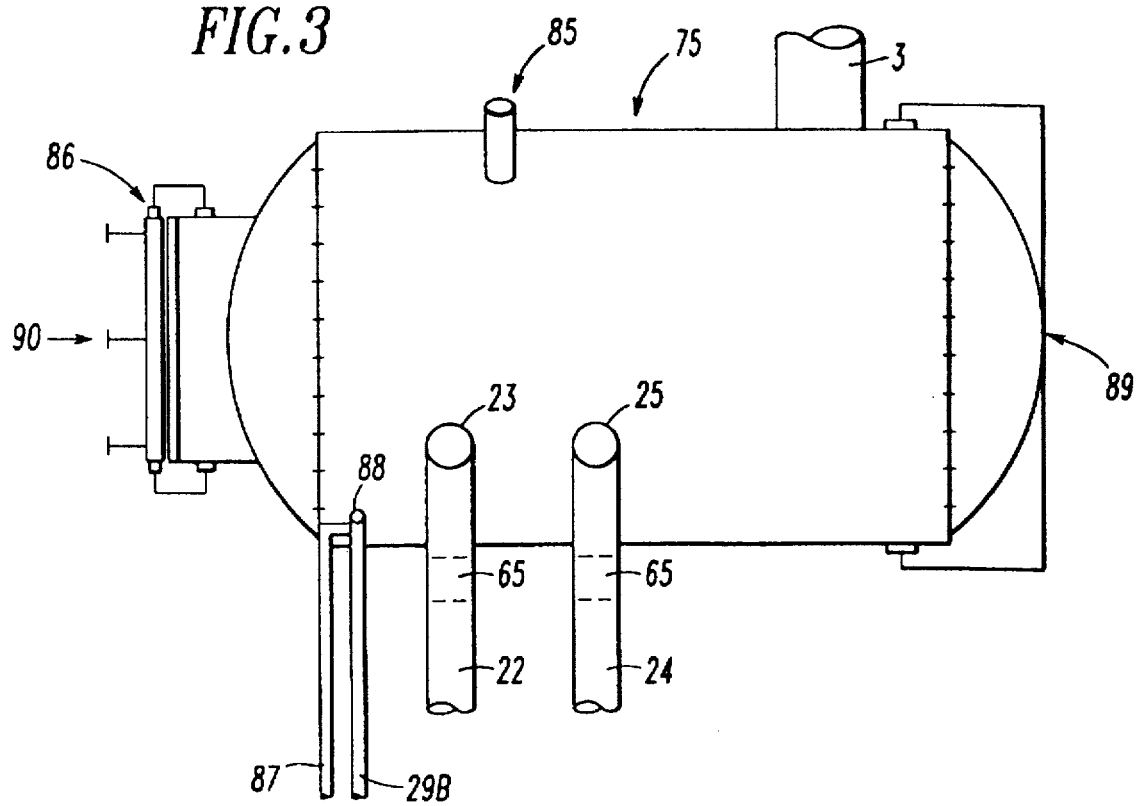
FIG. 3 is a cross-sectional view of a batch-type combustion chamber employed in a preferred embodiment of the ventless, combustible waste reduction process and apparatus of the present invention.

If the combustion chamber is of the batch-type, the system will shut down after all the waste fuel has been combusted. FIG. 3 illustrates a batch-type combustion chamber 75 which may also be used in accordance with the process of the present invention. The induction fans in the system remain in operation for up to eight hours after the "burn down" has been completed to clean the flue gases remaining in the system. A by-pass conduit may be used during this time to route the flue gases around the combustion chamber so that the gases do not pick up any of the fly ash in the combustion chamber. After the combustion chamber 75 cools down, the ashes may be removed through the dome door 89 which provides access to the interior of the combustion chamber for ash removal or for servicing the refractory therein. The dome door 89 is sealed with an high-temperature elastomeric gasket such as a rope gasket similar in type to those used on boiler doors. After the batch-type chamber 75 is cleaned, it may be then loaded again with waste through loading door 86. Once the waste is loaded, door locks 90 are employed to keep the loading door 86 secure and the combustion chamber 75 air-tight. The waste is then ignited and combusted as described above.

The stackless, combustible waste reduction process of the present invention operates continuously in the manner described above. The size of the combustion chambers 2 or 75, as with the entire system, is determined by the amount of waste to be reduced in an eight (8) to twenty four (24) hour period of time. The combustion chambers 2 and 75 are fabricated metal shells with a high temperature insulation applied to the inside of the shell. The insulation is covered by a high temperature refractory liner rated for temperatures up to 2,400° F. The operation temperature of the combustion chamber 2 is preferably from about 1,800° F. to about 2,000° F. As described above, the transfer rams are used to move the waste through the waste holding chambers of the combustion chamber 2 as the process of the present invention is carried out. If liquid waste is to be reduced, then the hydraulic transfer rams are not required.

Flow rates, fan sizes, and chamber sizes are also determined by the amount of combustible waste or liquid waste to be reduced over a specified period of time. The process of the present invention is capable of handling combustible waste in an operating range from one hundred (100) pounds to in excess of one thousand (1,000) tons in a twenty four (24) hour period of time, functioning within the preferred pressure ranges set forth above.

Although the invention has been described in detail in the foregoing for the purpose of illustration, it is to be understood that such detail is solely for that purpose and that variations can be made therein by those of ordinary skill in the art without departing from the spirit and scope of the invention as defined by the following claims, including all equivalents thereof.

What is claimed is:

1. A process for combusting waste material comprising the steps of:
   (a) loading combustible waste into an air-tight combustion chamber where the waste is combusted;
   (b) passing a resulting flue gas stream from the combustion chamber to a heat reduction chamber where the temperature of the flue gas stream is reduced;
   (c) passing the flue gas stream from the heat reduction chamber to a heat exchanger where the temperature of the flue gas stream is further reduced;
   (d) passing the flue gas stream from the heat exchanger to a gas cleaning chamber where some acids contained within the flue gas stream are neutralized and particulates are removed;
   (e) enriching the flue gas stream from the cleaning chamber with oxygen; and
   (f) injecting the oxygen enriched flue gas stream into the combustion chamber in varying amounts in response to pressure and temperature measurements taken in the combustion chamber to maintain the pressure and temperature in the combustion chamber within pre-selected ranges.

2. The process of claim 1 wherein the combustion chamber comprises a first waste holding chamber reversibly sealed from the outside by a hopper door and from a second waste holding chamber by a first door; a first transfer ram for transferring waste from the first waste holding chamber to the second waste holding chamber; the second waste holding chamber being reversibly sealed from a combustion loading chamber by a second door; a second transfer ram for transferring waste from the second waste holding chamber to the combustion loading chamber; the combustion loading chamber being reversibly sealed from a combustion zone by a third door; and a third transfer ram for transferring waste from the combustion loading chamber to the combustion zone.

3. The process of claim 2 wherein the combustion chamber comprises at least one additional transfer ram disposed within the combustion zone for transferring combusted waste into a combusted waste collection means.

4. The process of claim 1 wherein the heat reduction chamber is lined with insulation and refractory material and comprises a lower section having deflectors disposed therein for trapping particulates from the flue gas stream.

5. The process of claim 1 wherein the gas cleaning chamber comprises a lime bath, a lime water spray and a charcoal filter wherein the flue gas stream is introduced into the lime bath at a depth of about 30% below the surface of the lime bath and upon exiting the lime bath, the flue gas stream passes through the lime water spray and through the charcoal filter.

6. The process of claim 1 wherein the flue gas stream coming from the gas cleaning chamber is enriched with oxygen in a ratio from about 20% to about 30%.

7. The process of claim 1 wherein the waste is combusted in the combustion chamber at a pressure below atmospheric pressure.

8. The process of claim 1 wherein the waste is combusted in the combustion chamber at a temperature from about 1800° F. to about 2000° F. and the temperature of the flue gas stream in the heat reduction chamber is reduced to about 1100° F. and the flue gas stream from the heat exchanger is passed through a particulate trap prior to entering the gas cleaning chamber.

9. The process of claim 1 wherein the combustion chamber comprises at least one waste holding chamber reversibly sealed from the atmosphere and from a combustion zone and transfer means for transferring the waste from the waste holding chamber into the combustion zone without the escape of any flue gases from the combustion chamber to the atmosphere.

10. The process of claim 1 comprising the additional step of removing some of the particulates carried by the flue gas stream as it passes through the heat reduction chamber.

11. A process for combusting waste material comprising the steps of:

(a) loading combustible waste material into a first waste holding chamber which is reversibly sealed from the outside and from a second waste holding chamber;

(b) reversibly sealing the first waste holding chamber from the outside;

(c) transferring the combustible waste material from the first waste holding chamber to the second waste holding chamber which is reversibly sealed from a combustion loading chamber;

(d) reversibly sealing the second waste holding chamber from the first waste holding chamber;

(e) transferring the waste from the second waste holding chamber to the combustion loading chamber which is reversibly sealed from a combustion chamber;

(f) reversibly sealing the combustion loading chamber from the second waste holding chamber;

(g) transferring the combustible waste material from the combustion loading chamber to the combustion chamber where the waste is combusted;

(h) passing a resulting flue gas stream from the combustion chamber to a heat reduction chamber where the temperature of the flue gas stream is reduced;

(i) passing the flue gas stream from the heat reduction chamber to a heat exchanger where the temperature of the flue gas stream is further reduced;

(j) passing the flue gas stream from the heat exchanger to a gas cleaning chamber where some acids contained within the flue gas stream are neutralized and particulates are removed;

(k) enriching the flue gas stream from the cleaning chamber with oxygen; and (l) injecting the oxygen enriched flue gas stream into the combustion chamber in varying amounts in response to pressure and temperature measurements taken in the combustion chamber to maintain the pressure and temperature in the combustion chamber within pre-selected ranges.

12. The process of claim 11 wherein the waste is combusted in the combustion chamber at a temperature from about 1800° F. to about 2000° F. and the temperature of the flue gas stream in the heat reduction chamber is reduced to about 1100° F. and the flue gas stream from the heat exchanger is passed through a particulate trap prior to entering the gas cleaning chamber.

13. The process of claim 11 wherein the heat reduction chamber is lined with insulation and refractory material and comprises a lower section having deflectors disposed therein for trapping particulates from the flue gas stream.

14. The process of claim 11 wherein the gas cleaning chamber comprises a lime bath, a lime water spray and a charcoal filter wherein the flue gas stream is introduced into the lime bath at a depth of about 30% below the surface of the lime bath and upon exiting the lime bath, the flue gas stream passes through the lime water spray and through the charcoal filter.

15. The process of claim 11 wherein the flue gas stream coming from the gas cleaning chamber is enriched with oxygen in a ratio from about 20% to about 30%.

16. The process of claim 11 wherein the waste is combusted in the combustion chamber at a pressure below atmospheric pressure.

17. The process of claim 11 comprising the additional step of removing some of the particulates carried by the flue gas stream as it passes through the heat reduction chamber.

18. An apparatus for the ventless reduction of waste material by combustion comprising:

an air-tight combustion chamber;

a heat reduction chamber in air-flow communication with the combustion chamber;

a heat exchanger in air-flow communication with the heat reduction chamber;

a first fan for drawing flue gases through the apparatus disposed between the heat exchanger and a gas cleaning chamber;

a second fan for drawing the flue gases from the gas cleaning chamber through a conduit back into the combustion chamber;

an oxygen supply for enriching the flue gases in the conduit with oxygen to produce an oxygen enriched flue gas stream;

a motorized gas supply valve disposed in the conduit; and control means for maintaining the pressure and temperature in the combustion chamber within pre-selected ranges set in the control means by varying the flow of the oxygen enriched flue gas stream through the gas supply valve into the combustion chamber in response to pressure and temperature measurements from the combustion chamber monitored by the control means.

19. The apparatus of claim 18 wherein the combustion chamber comprises a first waste holding chamber reversibly sealed from the outside by a hopper door and from a second waste holding chamber by a first door; a first transfer ram for transferring waste from the first waste holding chamber to the second waste holding chamber; the second waste holding chamber being reversibly sealed from a combustion loading chamber by a second door; a second transfer ram for transferring waste from the second waste holding chamber to the combustion loading chamber; the combustion loading chamber being reversibly sealed from a combustion zone by a third door; and a third transfer ram for transferring waste from the combustion loading chamber to the combustion zone; and at least one additional transfer ram disposed within the combustion zone for transferring combusted waste into a combusted waste collection means.

20. The apparatus of claim 19 wherein the control means controls (i) the operation of the combustion chamber and a hopper containing waste so that the waste is automatically loaded from the hopper to the combustion zone without the escape of any flue gases from the apparatus and (ii) the transfer of the combusted waste into the combusted waste collection means by the at least one additional transfer ram.

21. The apparatus of claim 18 wherein the heat reduction chamber is lined with insulation and refractory material and comprises a lower section having deflectors disposed therein for trapping particulates from the flue gases.

22. The apparatus of claim 18 wherein the gas cleaning chamber comprises a lime bath, a lime water spray and a charcoal filter wherein the flue gases are introduced into the lime bath at a depth of about 30% below the surface of the lime bath and upon exiting the lime bath, the flue gases pass through the lime water spray and through the charcoal filter.

23. The apparatus of claim 18 wherein the waste is combusted in the combustion chamber at a pressure below atmospheric pressure.

24. The apparatus of claim 18 wherein the oxygen enriched flue gas stream comprises from about 20% to about 30% oxygen.

25. The apparatus of claim 18 wherein the combustion chamber comprises at least one waste holding chamber reversibly sealed from the atmosphere and from a combustion zone and transfer means for transferring the waste from the waste holding chamber into the combustion zone without the escape of any flue gases from the combustion chamber to the atmosphere.

26. The apparatus of claim 18 further comprising a particulate trap disposed between the heat exchanger and the first fan which the flue gases pass through prior to entering the gas cleaning chamber.

* * * * *